United States Patent [19]

Matsushima et al.

[11] 4,015,978
[45] Apr. 5, 1977

[54] METHOD FOR PRODUCTION OF MAGNESIUM-CONTAINING BRIQUETS AND MAGNESIUM

[75] Inventors: Tomoo Matsushima; Tsutou Odajima; Junzo Tsuruki; Yasuo Yoshida, all of Yokohama

[73] Assignee: Showa Denko Kabushiki Kaisha, Tokyo, Japan

[22] Filed: Oct. 17, 1975

[21] Appl. No.: 623,490

[30] Foreign Application Priority Data

Feb. 21, 1975 Japan .............................. 50-20852
Feb. 21, 1975 Japan .............................. 50-20853

[52] U.S. Cl. .................................. 75/10 A; 75/3; 75/67 R
[51] Int. Cl.² ................................. C22B 29/00
[58] Field of Search ...................... 75/67 R, 10 A, 3

[56] References Cited

UNITED STATES PATENTS 3,918,959  11/1975  Matsushima et al. .............. 75/67 R

*Primary Examiner*—M. J. Andrews
*Attorney, Agent, or Firm*—Oblon, Fisher, Spivak, McClelland & Maier

[57] ABSTRACT

Briquets having an overall bulk density in the range of 1.4 to 2.2 g/cm³, squeeze strength at room temperature in the range of 30 to 230 kg/cm², an overall porosity in the range of 35 to 55% and a refractoriness in the range of Pyrometric Cone No. 15 to No. 31 and used as the raw material for high-temperature pyrolitic reduction of magnesium are disclosed. Also disclosed is a method for the production of magnesium by high-temperature pyrolitic reduction, characterized by allowing said briquets as the material for high-temperature reduction to be retained undisintegrated in a floating state on the surface of the slag formed in the electric furnace until vaporization of magnesium from said briquets ceases.

12 Claims, 24 Drawing Figures

A; Crude grains of ferrosilicon

D; Matrix formed of a mixture of roasted doromite and calcium-silicon alloy

C; Grains of calcium-silicon alloy

B; Roasted dolomite grains predominantly of MgO

Matrix formed of a mixture of roasted dolomite and calcium-silicon alloy produced in consequence of the formation of calcium.

E; Grains of roasted dolomite predominantly of MgO

F; Grains of ferrosilicon

G; Matrix formed of roasted dolomite

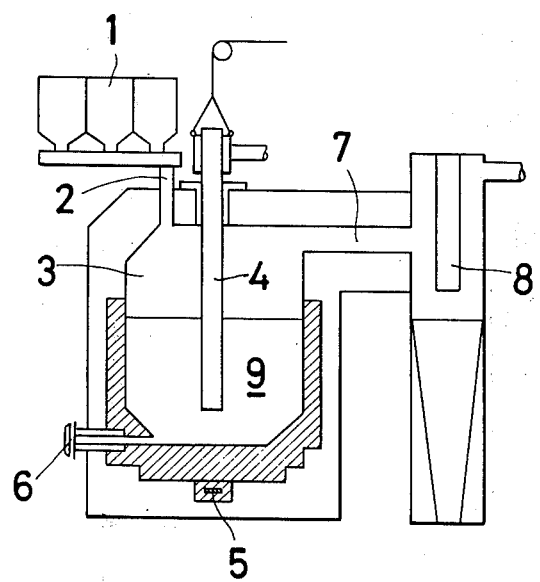
Fig_14

METHOD FOR PRODUCTION OF MAGNESIUM-CONTAINING BRIQUETS AND MAGNESIUM

This invention relates to magnesium-containing briquets which, in the process for refining a magnesium ore to extract the magnesium vapor from said ore through vaporization, are used for the purpose of notably increasing the velocity of magnesium vaporization and markedly improving the yield of magnesium and to a method for the production of magnesium by high-temperature pyrolytic reduction using said magnesium-containing briquets.

Production of magnesium by the high-temperature pyrolytic reduction of magnesium oxide is a process for obtaining metallic magnesium by reducing roasted natural dolomite or roasted synthetic dolomite with silicon as the reducing agent at an elevated temperature under a high degree of vacuum so as to give rise to magnesium vapor and then condensing the magnesium vapor into a liquefied or solidified state. As typical examples of the high-temperature pyrolytic reduction so far put to actual use on a commercial scale, there may be cited the Pidgeon Process and the Magnetherm Process.

By the Pidgeon Process, an externally heated steel-made retort is charged with one batch of raw material in the form of briquets and the raw material is held under conditions of about 1200° C of temperature and $10^{-2}$ mmHg of pressure to undergo a reaction, and the magnesium consequently vaporizing from the briquets is condensed into a solid state in a low-temperature zone. The solid magnesium and the residual slag are then removed from the retort. Thereafter, the empty retort is charged with the next batch of raw material. Thus, this process is effected by a batchwise operation. Because of the operation is batchwise and is subject to the limited dimensions of the retort, this process proves inefficient for the purpose of mass production.

In the case of the Magnetherm Process, there is used a vacuum type electric furnace in which the molten slag itself serves as an element possessing electric resistance and, because of the attendant heat-producing Joule effect, functions as an inner heat source. The furnace is charged with the raw materials such as, for example, ferrosilicon and roasted dolomite which are respectively in the form of particles 5 to 15mm in diameter. The raw materials are then held under conditions of 1500° C and 20 mmHg to undergo reaction and consequently generate magnesium vapor. The molten slag which gradually accumulates within the furnace is allowed to flow out of the furnace at fixed intervals. Adoption of this process makes it easy to increase the production capacity. While the Pidgeon Process gives a daily magnesium output of 60 to 100kg per retort, the Magnetherm Process provides an improved daily magnesium output of 2.5 to 7.5 tons per furnace.

In the Magnetherm Process, however, since the reaction which produces magnesium substantially proceeds in the liquid phase, there are entailed various problems such as lowered reaction velocity, degraded magnesium yield, accelerated consumption of electrode due to the reaction between the electrode carbon and the slag, lowered purity of produced magnesium and difficulty in the control of reaction.

A method capable of providing an improved yield of magnesium while overcoming said problems was formerly developed by a group of inventors including one of the present inventors. Patent was applied for on this invention in Japan (Japanese Pat. No. 144648/1973). An application for U.S. Pat. Ser. No. 536,175) was also filed under, Convention priority based upon said Japanese Patent Application. This is an improved method whereby metallic magnesium is obtained by using, as the raw material, a mixture of magnesium oxide and calcium oxide, reducing this mixture with silicon at an elevated temperature to produce magnesium vapor and condensing the magnesium vapor. To be specific, this improved method comprises two steps: In the first step, briquets are prepared by admixing at least one member selected from the group consisting of silicon and ferrosilicon with a substance composed of magnesium oxide and calcium oxide and briquetting the resultant mixture, and these briquets are heated at a temperature above the melting point of calcium-silicon alloy in the atmosphere of an inert gas under temperature and pressure conditions capable of substantially minimizing generation of magnesium vapor so as to permit occurrence of calcium-silicon alloy within said briquets. In the second step, said briquets containing the formed calcium-silicon alloy are heated within a heating furnace so that magnesium oxide present in the briquets is reduced into magnesium.

This method, thus, comprises the first step the formation of calcium-silicon alloy in the briquets and the second step of heating the briquets and thereby generating magnesium vapor.

Observation of the behavior of the briquets within the furnace in the course of the actual operation has assured the inventors that further improvement in the yield of magnesium can be obtained by limiting the physical properties of briquets to specific ranges. The present invention has been accomplished on the basis of this knowledge.

A primary object of the present invention is to provide magnesium-containing briquets which are highly advantageous for the purpose of pyrolytic reduction of magnesium oxide.

Another object of the present invention is to provide a method for the production of magnesium in an extremely high yield by means of pyrolytic reduction.

To accomplish the objects described above, the magnesiumcontaining briquets for high-temperature pyrolytic reduction according to the present invention which invariably have the components thereof in a finely divided and dispersed state are of (1) a composition consisting of magnesium oxide, components naturally present in the magnesium ore, one member selected from the group consisting of ferrosilicon and silicon and calcium oxide, (2) a composition having a calcium-silicon alloy in addition to the components of said composition or (3) a composition consisting of magnesium oxide, components naturally present in the magnesium ore and a calcium-silicon alloy. These briquets are characterized by having an overall bulk density in the range of from 1.4 to 2.2 g/cm$^3$, squeeze strength at room temperature in the range of from 30 to 230 kg/cm$^2$, an overall porosity in the range of from 35 to 55% and a refractoriness in the range of Pyrometric Cone No. 15 to No. 31.

When these magnesium-containing briquets are introduced into an electric furnace containing slag, they do not submerge under the slag but remain in a floating state on the surface of the slag and, because of the reaction conditions permit the reduction to proceed inside the individual briquets. Consequently, magnesium vapor is generated from the briquets. Subsequently to said generation of the magnesium vapor, these briquets sink and melt into the slag. The briquets are retained in said floating state until said generation of magnesium vapor ceases. In other words, the briquets remain on the surface of the slag from the time they are introduced into the furnace to the time the generation of magnesium vapor is completed. The floating state in which the briquets are retained between said two points of time constituents itself one characteristic feature of the present invention. It is solely because of this peculiar behavior of the briquets that the method of the present invention provides an outstanding yield of magnesium as compared with the known conventional method.

FIGS. 1(a) and (b) are photomicrographs of magnesium-containing briquets obtained by treating dolomite-ferrosilicon briquets at 1000° C for 30 minutes.

FIGS. 2(a) and (b) are photomicrographs of magnesium-containing briquets obtained by treating dolomite-ferrosilicon briquets at 1200° C for 30 minutes.

FIGS. 3(a) and (b) are photomicrographs of green briquets prepared from dolomite and ferrosilicon.

FIGS. 4(a), (b), (c), (d) and (e) are a series of photographs illustrating the process in which the generation of magnesium vapor from green magnesium-containing briquets occurs in an electric furnace.

FIGS. 5(a), (b), (c) and (d) are a series of photographs illustrating the process in which the generation of magnesium vapor from fired magnesium-containing briquets occurs in an electric furnace.

FIG. 14 is a diagram showing a model of the reaction furnace used in the preferred embodiments and in the comparative examples.

First, the magnesium-containing briquets according to the present invention will be described.

The magnesium-containing briquets constitute the raw material which is to be treated in a magnesium reduction furnace for the purpose of producing metallic magnesium. The magnesium-containing briquets of the present invention, therefore, can be subjected to a reduction step on site or, depending on the particular geographical conditions involved, may be transferred to a separate location for the necessary reduction step. They are a raw material for the refinement of magnesium developed with a view to notably improving the velocity of magnesium vaporization and the actual yield of metallic magnesium as compared with the known methods. They are, therefore, particularly advantageous as the raw material for the production of magnesium according to the method to be described afterward. If they are used as the raw material for pyrolytic reduction by any known method, they can be expected to improve the results of the refining operation involved.

The magnesium-containing briquets according to the present invention which invariably have the components thereof in a finely divided and dispersed state are of (1) a composition consisting of magnesium oxide, components naturally present in the magnesium ore, one member selected from the group consisting of ferrosilicon and silicon and calcium oxide, (2) a composition having a calcium-silicon alloy in addition to the components of said composition or (3) a composition consisting of magnesium oxide, components naturally present in the magnesium ore and a calcium-silicon alloy. The briquets are characterized by having an overall bulk density in the range of from 1.4 to 2.2 kg/cm$^3$, squeeze strength at room temperature in the range of from 30 to 230 kg/cm$^2$, an overall porosity in the range of from 35 to 55% and a refractoriness in the range of Pyrometric Cone No. 15 to No. 31. By "magnesium-containing briquets" is meant not merely green briquets which are obtained by simply mixing the components and briquetting the resultant mixture but also heat treated briquets which are obtained by heat-treating said green briquets.

Said calcium-silicon alloy and its possible modifications containing additional elements such as iron-calcium-silicon alloy will collectively be referred to hereinafter as "calcium-silicon alloy".

The aforementioned properties possessed by the magnesium-containing briquets of the present invention constitute significant requirements for accomplishing the said purposes of accelerating the velocity of magnesium vaporization and improving the actual yield of magnesium. These requirements will be explained in detail herein below.

The microstructure of the magnesium-containing briquets according to the present invention is evident from the photomicrographs of FIG. 1(a) through FIG. 3(a) and from the diagrams of FIG. 1(b) through FIG. 3(b) illustrating the components making up the texture of the briquets.

Figure 1A:

FIG. 1(a) is a 120-magnification photomicrograph of a cross section of a magnesium-containing briquet and by mixing the pulverizing dolomite, which is a magnesium-containing ore, and ferrosilicon, molding the pulverized mixture in the form of a briquet and heating this briquet at 1000° C for 30 minutes in the atmosphere of argon so as to give rise to a calcium-silicon alloy therein.

Figure 1B:
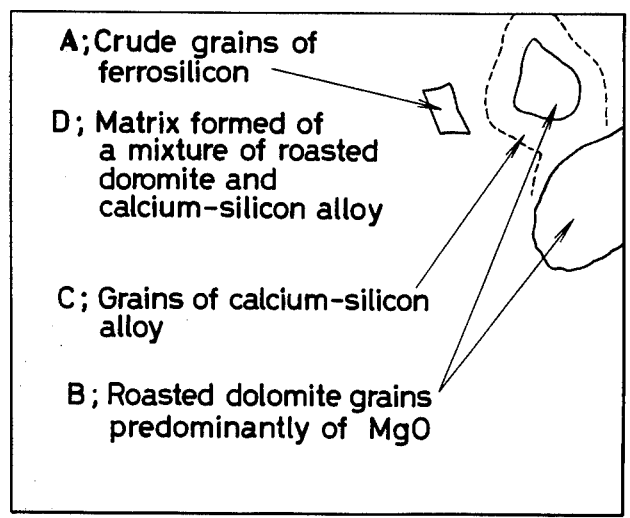

It is seen in FIG. 1(a) that, as indicated in FIG. 1(b), crude grains of ferrosilicon denoted by A, roasted dolomite grains predominantly of magnesium oxide denoted by B and grains of calcium-silicon alloy formed under the aforementioned conditions and denoted by C are distributed in a matrix formed of a mixture of roasted dolomite and calcium-silicon alloy. The specimen illustrated in FIGS. 1(a) and 1(b) is of a typical heated briquet having an overall Si/2MgO molar ratio of 1.5. The largest grain size is seen to occur in the grains of roasted dolomite predominantly of MgO denoted by B, the particle diameter being 0.1mm. The grains of the other components in the texture are invariably less than 0.1mm in particle diameter.

Figure 2A:
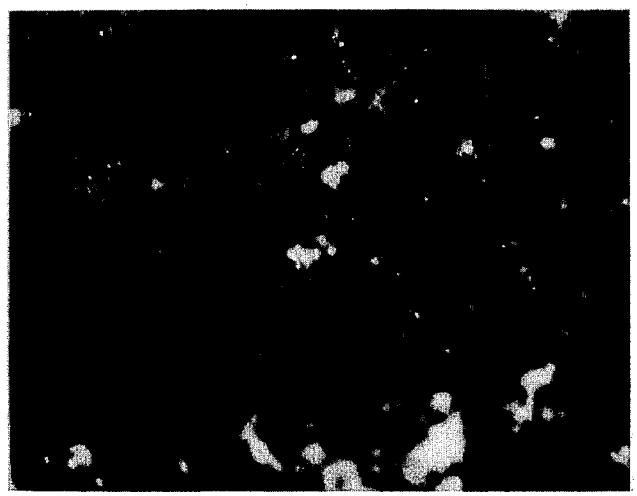
Figure 2B:
Figure 3A:
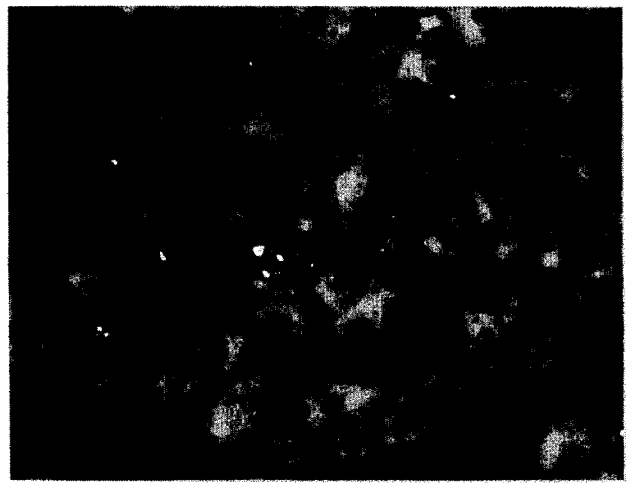
Figure 3B:
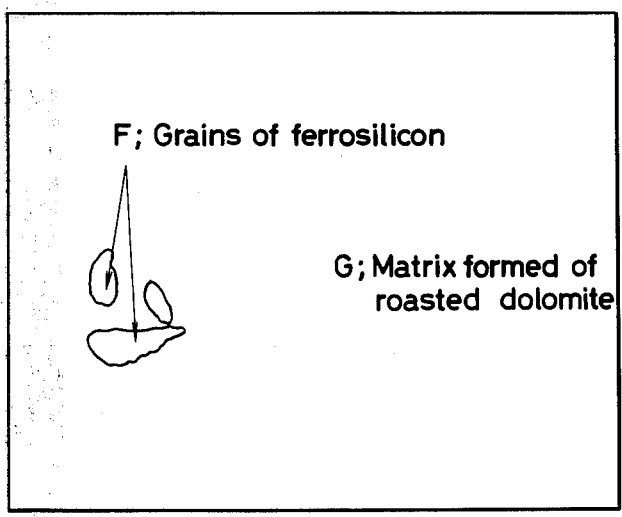
Figure 4A:
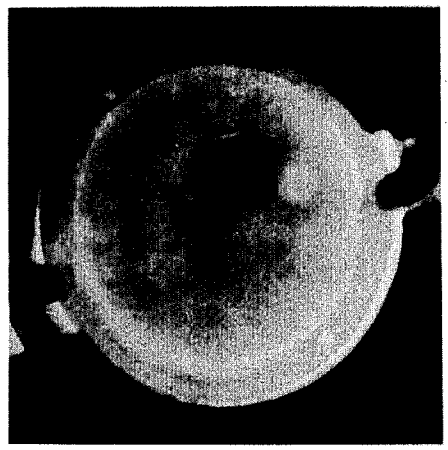
Figure 4B:
Figure 4C:
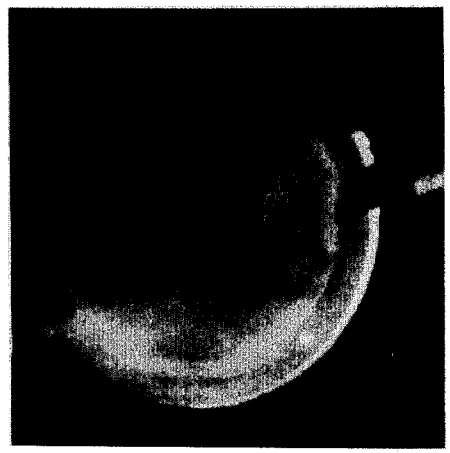
Figure 4D:
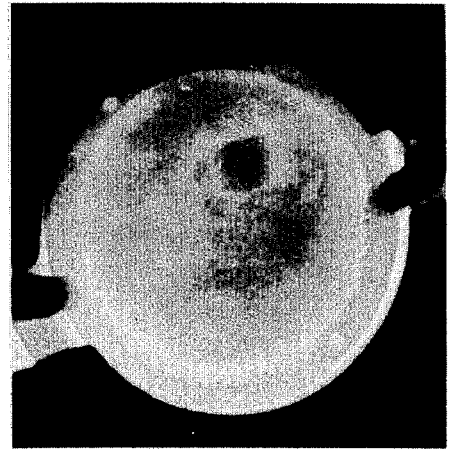
Figure 4E:
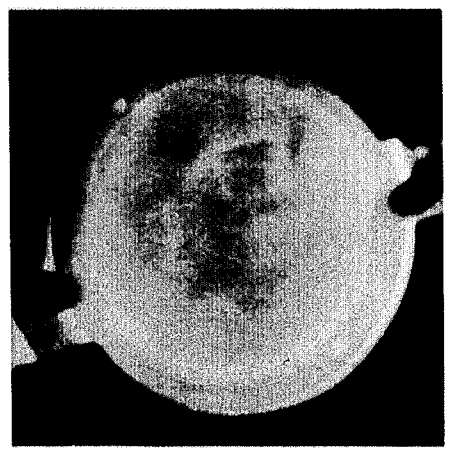
Figure 5A:
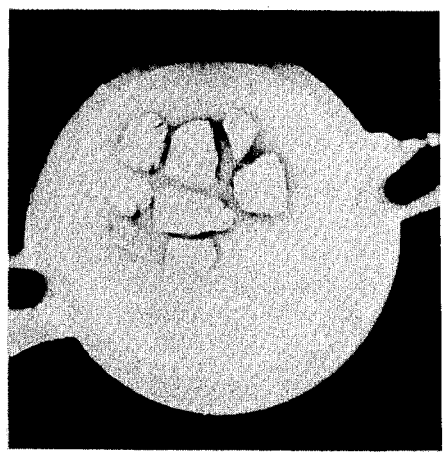
Figure 5B:
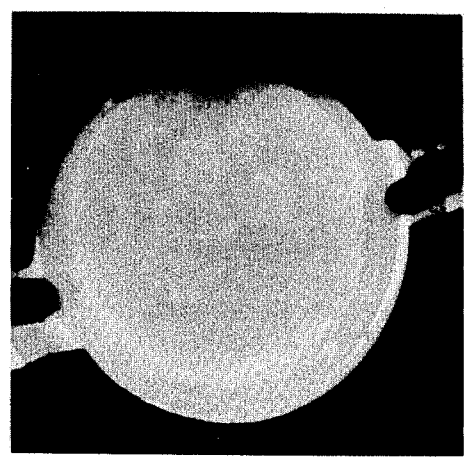
Figure 5C:
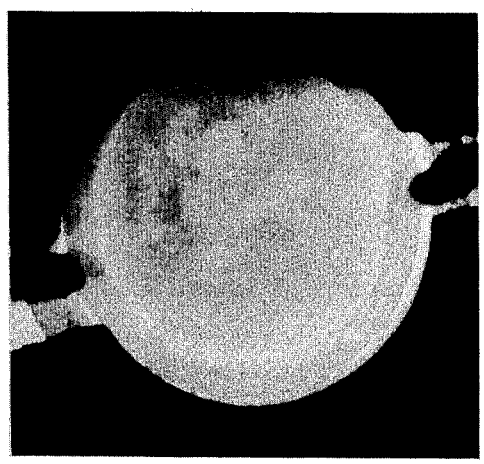
Figure 5D:

FIGS. 2(a) and 2(b) illustrate a specimen of the magnesiumcontaining briquet which had entirely the same composition as that of the specimen of FIG. 1 and which had undergone a heated treatment performed at 1200° C for 30 minutes in the atmosphere of argon. In this diagram, E denotes grains of roasted dolomite formed predominantly of MgO in a matrix which comprises a mixture of roasted dolomite and calciumsilicon alloy produced in consequence of the formation of calcium. Compared with the briquet shown in FIG. 1, the briquet shown in this diagram is noted to have involved an advanced conversion to a calcium-silicon alloy to the extent of causing thorough extinction of ferrosilicon particles. The largest particle size of the grains found in the entire texture does not exceed 0.1mm. Moreover, the individual grains distributed in the texture are noted to be much finer than those of the briquet of FIG. 1.

FIG. 3 illustrates a specimen of a green briquet (namely, a briquet obtained simply by mixing the components and briquetting the mixture without any further treatment) corresponding to the heated briquets shown in FIG. 1 and FIG. 2. In the diagram, F denotes grains of ferrosilicon and G those of dolomite formed preponderantly of MgO. The particle size of the individual grains does not exceed 0.1mm.

The magnesium-containing briquets according to the present invention are characterized by having an overall bulk density in the range of from 1.4 to 2.2 g/cm$^3$ and an overall porosity in the range of from 35 to 55%.

The aforementioned ranges of bulk density and porosity are physical requirements to be fulfilled by the magnesium-containing briquets of the present invention in order that these briquets may remain in a floating state on the surface of the molten slag within the reduction furnace in the reducing operation by means of these briquets.

The slag within the reduction furnace has a specific gravity of about 2.9 g/cm$^3$ while in its molten state. Owing to the relation between this specific gravity of the molten slag and the vapor pressure of magnesium issuing from the briquets in the reduction furnace in the course of the reaction, the fact that the magnesium-containing briquets of the present invention have an overall bulk density in the range of from 1.4 to 2.2 g/cm$^3$ and an overall porosity in the range of from 35 to 55% is an essential requirement in order that the magnesium-containing briquets of the present invention remain in a floating state on top of the free surface of said molten slag and are prevented from being submerged under the layer of molten slag.

In addition, the fact that the magnesium-containing briquets according to the present invention have refractoriness in the range of Pyrometric Cone No. 15 to No. 31 also forms an essential requirement for said briquets to remain in a floating state on top of the molten slag. This is because the low wettability of the briquets with the molten metal during the period when vaporization of magnesium from the inside of the briquets is proceeding, the heat transfer between the briquets and the molten slag and the thermal conductivity of solid briquets are so interrelated that coating of the surface layer of the briquets with the molten slag can occur when said refractoriness falls in said range. Immediately after introduction into the furnace, the briquets have rather limited contact by wetting with the molten slag because of the low wettability of the molten slag and, therefore, remain in a floating state on top of the molten slag. Shortly afterward, the briquets are wrapped up by the molten slag which forms a coat on the surface of the briquets and the coat of molten slag assumes a semi-coagulated state and gains in viscosity. Because of the semi-coagulated state and the enhanced viscosity of the molten slag, the briquets are allowed to remain in said floating state, notwithstanding that the difference of specific gravity between the briquets and the molten slag is on the order of 1.5 to 0.7 g/cm$^3$ (1.4 to 2.2 g/cm$^3$ for briquets and 2.9 g/cm$^3$ form molten slag) and, from the generally accepted theory of difference of specific gravity, part of the briquets would naturally be considered to sink partly into the layer of molten slag.

This is not the sole reason for said requirement that the refractoriness of briquets should be in the range of Pyrometric Cone No. 15 to No. 31. This requirement must also be fulfilled in order that the briquets may be prevented from being melted into the molten slag or from bringing about the phenomenon of decaying or softening while the vaporization of magnesium proceeds smoothly.

The briquets of the present invention having a refractoriness in the range of Pyrometric Cone No. 15 to No. 31 are never softened or dissolved but are allowed to remain in a floating state on top of the layer of the molten slag while the magnesium component is vaporized in the production of magnesium within the reduction furnace. Because of this peculiar behavior of the briquets, the method of the present invention operates and produces an effect of heightening the velocity of magnesium vaporization to a marked extent and improving the yield of magnesium as compared with the Magnetherm process whereby the individual raw materials involved in the production of briquets are fed into the furnace separately of one another and are allowed to be melted into the molten slag.

Said operation and effect of the present invention are evident from FIG. 4 and FIG. 5.

FIG. 4 represents a series of photographs taken along the course of time to illustrate the process in which a magnesium-containing green briquet of the present invention (magnesium-containing green briquet obtained by using a ferrosilicon having a silicon content of 75% by weight in such a formula as to satisfy Si/2MgO = 1.5 and CaO/MgO = 1.0 respectively by molar ratio) was placed as a raw material within a reaction furnace having a molten slag temperature of 1520° C and, after the magnesium contained therein had been completely vaporized out, said briquet was gradually melted into the molten slag.

In FIG. 4, plate 4a illustrates the condition of the magnesium-containing green briquet of the present invention at the time it was just introduced into the furnace interior. In this plate, the cylindrical portion seen at the center is the green briquet and the matrix of the plate is the molten slag. Plate 4b illustrates the condition of the same briquet 2 seconds after introduction into the furnace. The photograph of plate 4b is seen to be cloudy as compared with that of plate 4a, indicating that significant vaporization of magnesium began at this point. Plate 4c illustrates the condition of the briquet 40 seconds after the time of introduction. It is seen from the photograph that the vaporization of magnesium reached its peak. In plate 4d illustrating the condition of the briquet at a further advanced stage of treatment (180 seconds after the time of introduction), the cloudiness of is noted to be slightly decreased, indicating that the vaporization of magnesium approached termination. From this photograph, it is clearly seen that even at this stage, the briquet introduced at the outset still retained its original shape without being decayed or softened and melted and continued to remain in a floating state on top of the molten slag. Plate 4e illustrates the condition of the briquet 210 seconds after the time of introduction. This photograph clearly shows that at this stage, the briquet in which the vaporization of magnesium had already ceased was substantially completely dissolved into the molten slag.

FIG. 5 represents a series of photographs taken along the course of time to illustrate a process in which a heat treated magnesium-containing briquet obtained by heating a green briquet of the same composition as used in the briquet of FIG. 4 in the atmosphere of argon at 1200° C for 30 minutes so as to give rise to a calcium-silicon alloy therein was fed as the raw material in a reduction furnace containing a molten slag at 1500° C under the atmosphere of argon gas and, after emanation of magnesium vapor from within the briquet proceeded and eventually ceased, said briquet gradually melted into the molten slag.

In FIG. 5, plate 5a illustrates the condition of the magnesium-containing briquet according to the present invention at the time of introduction into the furnace, plate 5b the condition of cloudiness of the furnace interior due to the vaporization of magnesium 60 seconds after the time of introduction and plate 5c the condition of the furnace interior in which the vaporization of magnesium approached completion 100 seconds after the time of introduction and plate 5d clearly indicates the condition in which the briquet had completely melted into the molten slag 200 seconds after the time of introduction. It is evident that in this process, as illustrated in plates 5b and 5c, the briquet placed in the furnace still retained the shape assumed at the time of introduction and remained in a floating state on top of the molten slag while the vaporization of magnesium was in progress and even after it had ceased. It is clearly shown by the series of photographs of FIG. 5 that the melting of the briquets occurs about the time that the vaporization of magnesium comes to termination.

As illustrated above, the magnesium-containing briquets of the present invention take part in the reaction along the process as described above and serve to accelerate the velocity of magnesium vaporization and improve the yield of magnesium. This advantage cannot be realized unless said briquets satisfy the requirement that the overall bulk density falls in the range of from 1.4 to 2.2 kg/cm$^3$, the overall porosity in the range of from 35 to 55% and the refractoriness in the range of Pyrometric Cone No. 15 to No. 31.

The magnesium-containing briquets to be used according to the present invention has a composition such that the components thereof generally fall in fixed ranges as shown below. An alloy composed preponderantly of silicon such as ferrosilicon having a silicon content of not less than 70% by weight, silicon, a magnesium oxide-containing raw material and a calcium oxide-containing raw material are combined in respective amounts to give the following molar ratios: Si/2-MgO = 0.9 to 1.5 and CaO/MgO = 1.9 to 1.5.

One of the essential requirements to be satisfied by the magnesium-containing briquets according to the present invention is that they have squeeze strength at room temperature in the range of from 30 to 230 kg/cm$^2$. The squeeze strength is to be measured by the following method:

From a given briquet, a test piece of a given volume is cut off (in accordance with the method for testing the compression strength specified as by JIS A1108) and the compressive force applied to said test piece in opposed vertical directions is gradually increased until the test piece fractures. The pressure which has caused the fracture is divided by the crosssectional area of the test piece and the quotient obtained is reported as the squeeze strength.

Briquets having a low room-temperature squeeze strength show a conspicuous trend toward disintegration into a fine powder at the time that they are introduced into the reduction furnace. When such a fine powder is formed, it is sucked down in its unconverted state inside the magnesium reduction furnace in which the atmosphere is maintained under a reduced pressure and then it is collected in the condenser. Inside the condenser, the powder mingles with the metallic magnesium already condensed, with the result that the purity of the produced magnesium is lowered and the yield of magnesium itself if degraded. Such a situation as this should be avoided to the fullest possible extent in the course of vaporization refining operation such as of magnesium production.

Although the size of individual briquets is not specifically limited, the briquets are only required to have a diameter of at least 2mm in order that, in the course of the reducing operation, they may not be discharged in their unreduced state from the furnace interior. Generally, briquets measuring from 5 to 50mm in diameter are used.

In high purity of magnesium and high rate of reduction, there reside the significance and object of avoiding charging the reduction furnace with magnesium in its powdery state and of briquetting raw materials in a proper size. Even when the powder and the briquets have one and the same chemical composition, they bring about a decided difference in the yield and grade of magnesium for the reason described above. They should not be evaluated on the same level.

The magnesium-containing raw material to be fed to the furnace as raw magnesium ore varies with the construction and dimensions of the particular reduction furnace to be used. Generally, however, it is fed into the furnace interior so as to land on the free surface of the molten slag which is regarded as a quasi-rigid substance, involving usually a fall of 1 to 3 meters or occasionally even more. Thus, the briquets are required to have squeeze strength at room temperature exceeding a fixed level in order to avoid being disintegrated into a fine powder by the impact force of the fall. Through this experience in furnace operation the inventors have ascertained that the lower limit of said roomtemperature squeeze strength is 30 kg/cm$^2$.

Where there were used green briquets having squeeze strength at room temperature of not more than 30 kg/cm$^2$, more specifically, in the range of from 25 to 18 kg/cm$^2$, for example, half the total number of said briquets were seen to disintegrate and fly in the form of dust in all directions when they were introduced into the furnace and allowed to fall onto the molten slag, from a height of 2.5 meters. In the case of heat treated briquets having squeeze strength at room temperature of 30 kg/cm², however, no disintegration was seen to occur when they were fed into the furnace in a similar manner.

The upper limit of the squeeze strength at room temperature is 230 kg/cm². This value of the upper limit represents the highest level that is achievable by the briquetting performed on an ordinary briquet machine with due consideration paid to the overall bulk density and the overall porosity desired to be retained by the magnesium-containing briquets satisfying the requirements of the present invention. Desired avoidance of the possible disintegration of briquets into a fine powder can be accomplished even if the squeeze strength at room temperature exceeds this upper limit. When this upper limit is exceeded, however, there result lowered porosity, heavy hindrance to vaporization of magnesium and serious degradation of magnesium vaporization velocity and magnesium yield. Thus, the room temperature squeeze strength must be kept within the upper limit by all means.

It is, accordingly, essential that the squeeze strength at room temperature of the magnesium-containing briquets of the present invention should fall in the range of from 30 to 230 kg/cm².

The magnesium-containing briquets according to the present invention can easily be manufactured from the powdered raw materials by a known method by use of a briquetting machine or a tablet machine, for example.

As described in detail above, the production of magnesium effected by using, as the magnesium source, the magnesium-containing briquets of the aforementioned description manifests a conspicuous effect of accelerating the reducing operation to a marked extent and enhancing the yield of magnesium to a notable extent.

When the magnesium-containing briquets of this invention are used, the reducing operation performed at 1500° C of furnace temperature under 50 mmHg of furnace interior pressure enables the yield of magnesium to reach a strikingly high value of 94.8%. In the case of conducting the reduction operation by the conventional Magnetherm process, the yield of magnesium is on a level of 80% as indicated, for example, in Japanese Pat. No. 7202/1955. For a fixed reduction furnace volume, the amount of magnesium ore to be treated within a fixed length of time in the operation using the briquets of this invention is twice as large as in the operation performed by said Magnetherm process.

As has been stated, the notable improvements indicated above which are brought forth by the use of the magnesium-containing briquets of the present invention are ascribable to the conspicuous acceleration of the speed of magnesium vaporization due to the various properties mentioned. From the operational point of view, said improvements produce an effect of enabling the working internal pressure of the furnace to be increased to a great extent as compared with conventional methods.

In the case of conventional typical processes such as the Pidgeon process and the Magnetherm process, the working internal pressure of the furnace is generally on the order of several tenths mmHg and 20 mmHg. In the case of an operation adopting the magnesium-containing briquets of the present invention, the refining can be smoothly performed under and internal pressure of 50 mmHg or even under normal pressure, while giving the favorable results as mentioned above.

Now, a description will be given of the method of the present invention by which required refining of magnesium is effected by use of the magnesium-containing briquets of the present invention.

In a continuous operation, the method for the manufacture of magnesium according to this invention is embodied in the form of the so-called high-temperature pyrolytic reduction of magnesium oxide, a process which comprises introducing the raw briquets into an electric furnace having a slag retained therein in a molten state and thereby causing the briquets to produce magnesium vapor. This method is characterized by causing the reduction reaction to proceed within the briquets while they are retained in a floating state on the surface of the molten slag, consequently making the briquets evolve magnesium vapor, and condensing the magnesium vapor, with the briquets subsequently allowed to dissolve into the molten slag after the vaporization of magnesium therefrom has terminated.

The briquets are produced by using calcium oxide, magnesium oxide and components naturally present in the raw magnesium and at least one member selected from the group consisting of silicon and ferrosilicon, if necessary, in the presence of a binder added thereto. When the briquets are introduced into the electric furnace, a calcium-silicon alloy is first produced within the briquets while the briquets are retained in a floating state on top. Then, magnesium oxide reacts upon the calcium-silicon alloy to bring about liberation of magnesium vapor. After the briquets are exhausted of magnesium, they are dissolved and allowed to sink into the molten slag.

In another possible composition, the briquets are made up of calcium oxide and a calcium-silicon alloy and at least one member selected from the group consisting of magnesium oxide, components naturally present in the magnesium ore, ferrosilicon and silicon. Besides, a composition containing magnesium oxide, components naturally present in the magnesium ore, and a calcium-silicon alloy is also possible for the magnesium-containing briquets for use in the method of the present invention. The briquets of any one of the compositions mentioned above are invariably required to remain in a floating state on top of the molten slag and retain their shape intact until the generation of magnesium vapor due to the reaction of magnesium oxide with the calcium-silicon alloy present in the briquets comes to completion.

The molten slag is desired to have a specific gravity of about 2.9 g/cm³. The physical properties which the briquets are required to possess in order to satisfy the aforementioned requirements are such that the overall bulk density falls in the range of from 1.4 to 2.2 g/cm³, the squeeze strength at room temperature in the range of from 30 to 230 kg/cm², the overall porosity in the range of from 35 to 55% and the refractoriness in the range of Pyrometric Cone No. 15 to No. 31. These are the physical properties possessed by the magnesium-containing briquets of the present invention as already described.

Figure 6:
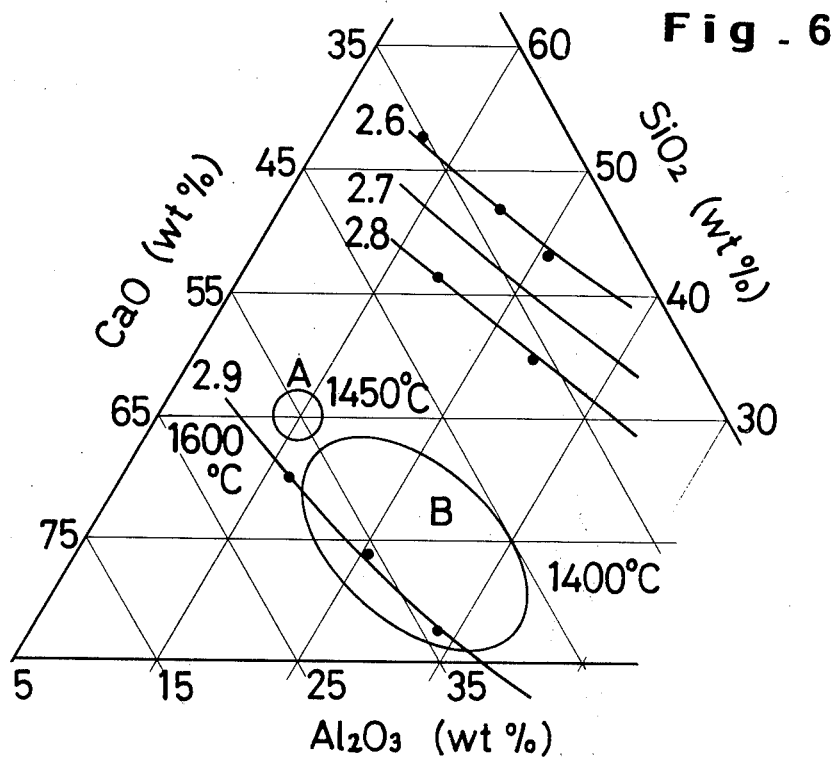
FIG. 6 is a diagram showing the relation between the composition and the specific gravity of slag.

FIG. 6 represents a diagram of iso-density lines obtained for a molten slag composed of the three components, calcium oxide, silicon dioxide and aluminium oxide, for the purpose of practicing the present invention. The straight lines appearing in the diagram represent iso-density lines of the magnitudes, in g/cm², of the numerical values indicated beside the lines. The area indicated as A represents what is obtained by adding alumina in a proportion of 15% to the dicalcium silicate ($Ca_2SiO_4$) which occurs in consequence of the reaction of roasted dolomite and silicon. This is identical with the fundamental composition of the slag of the known blast furnace. Further, the slag for the Magnetherm process is basically selected in the neighborhood of this composition. A slag having the alumina concentration heightened with a view to lowering the melting point of the slag is indicated by the area B. The slag to be used for the present invention is indicated by the area encompassing both the areas A and B and has a specific gravity of about 2.9 g/cm³.

The matters brought to light in the course of research directed to the development of the method of the present invention, including the results of experiments involved therein, will be described.

The reaction for the production of magnesium from roasted dolomite by use of silicon as the reducing agent, namely the reaction of roasted dolomite with silicon, is generally expressed by the following reaction formula.

$$2(MgO \cdot CaO) + Si = 2Mg + Ca_2SiO_4 \tag{1}$$

The inventors have discovered that in this reaction, 1) calcium oxide and silicon react very quickly upon each other to produce a calcium-silicon alloy and subsequently 2) magnesium oxide is reduced by said calcium-silicon alloy to give birth to magnesium vapor having a high vapor pressure. This knowledge has led the inventors to an invention of a method for the production of magnesium with an outstanding advantage.

The quick formation of said calcium-silicon alloy will be explained with reference to FIGS. 7 and 8.

Figure 7:
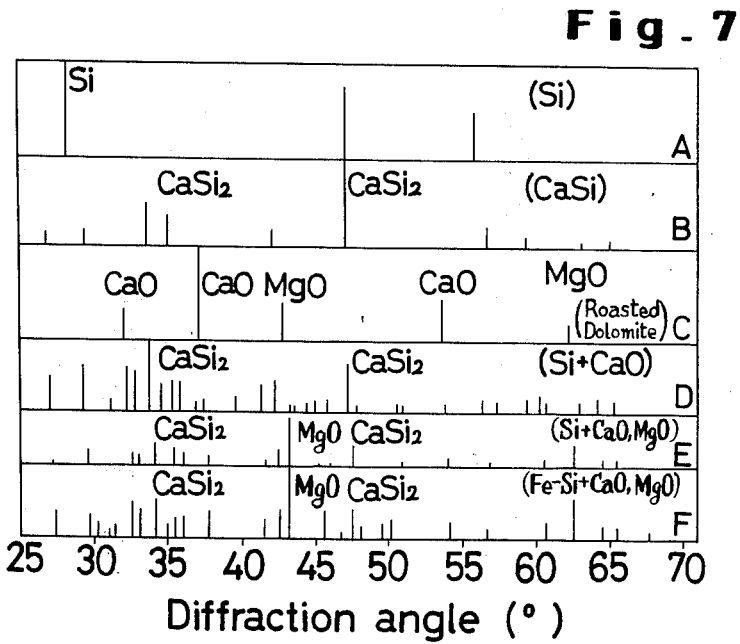
FIG. 7 is an X-ray diffraction diagram of the raw material and the product.

FIG. 7 is a typical X-ray diffraction diagram obtained chiefly from the present research. In the diagram, A denotes a spectrum of pure silicon, B of $CaSi_2$ diffracted on an ASTM card and C of roasted dolomite. D, E and F are the diffraction line of the products obtained respectively by mixing silicon and calcium oxide in amounts to give a molar ratio of Si/CaO = 5.4, silicon and roasted dolomite in amounts to give a molar ratio of Si/CaO = 5/4 and ferrosilicon having a silicon content of 75% and roasted dolomite in amounts to give a molar ratio of Si/CaO = 5/4, subsequently subjecting the mixtures to a heat treatment in the atmosphere of argon at 1200° C under a pressure of one atmosphere for 30 minutes and thereafter cooling the heated mixtures. From the diffraction diagrams of A, B and C, the positions at which rational diffraction lines indicative of the characteristics of different compounds are seen to be at 28°, (47°) and 55° for Si, 34°, 35° (and 47°) for $CaSi_2$, 31°, 37° and 54° for CaO and 43° and 62° for MgO. In the diffraction diagram D, the diffraction lines for the raw materials Si and CaO are substantially extinct and numerous diffraction lines indicative of the presence of $Ca_2SiO_4$ as well as those for $Ca-Si_2$ are observed instead. The diffraction diagram E, through practically the same as that of D, shows the residue of MgO in the product. The diffraction diagram F is similar to that of E. A review of the group of diffraction diagrams given in FIG. 7 reveals the following fact: The formation of $CaSi_2$ in the reaction of dolomite and ferrosilicon is evident, establishing the reaction mechanism which has been theorized by the inventors. There is also drawn a logical conclusion that MgO does not participate in the reaction under the conditions such as are described above and that ferrosilicon can be used in place of pure silicon.

Figure 8:
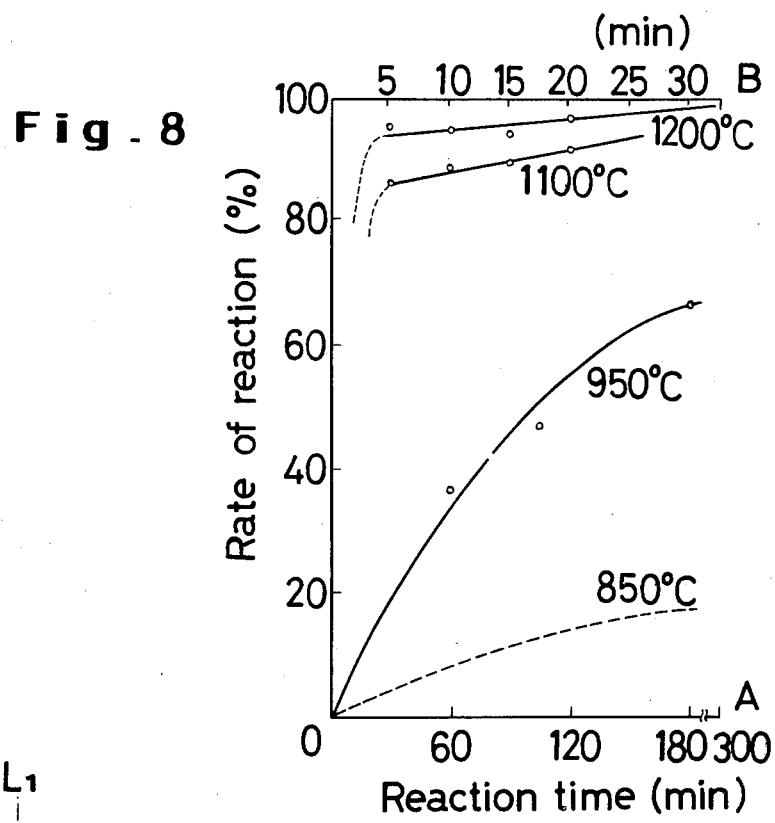
FIG. 8 is a diagram showing the relation between the time of heating and the conversion determined with respect to the reaction of calcium oxide and silicon.

FIG. 8 represents the conversion of CaO and Si into $CaSi_2$ in an operation in which briquets formed by mixing silicon and calcium oxide in amounts to give a molar ratio of Si/CaO = 5/4 and prepared so as to possess a specific gravity of about 1.8 are heated in an atmosphere of argon under pressure of one atmosphere. In the graph, the vertical axis represents the rate of reaction (in %) and the horizontal axis represents reaction time (in minutes), with the curves in the upper column representing data involving reaction temperatures of 1200° and 1100° C and the curves in the lower column those involving reaction temperatures of 950° and 850° C. It is observed that the reaction proceeds very quickly at 1100° and 1200° C, that particularly at 1200° C, the conversion reaches 95% within only 5 minutes and that at temperatures of not more than 950° C, the reaction proceeds very slowly. A possible reason for the conspicuous difference between the conversion at 950° and 1100° C is that at temperatures above the level of about 1050° C, the production of alloy occurs in a molten state and consequently the solid-liquid reaction proceeds significantly.

The quantitative measurement of the velocity of the formation of calcium-silicon alloy as described above has been accomplished for the first time by the inventors.

Now, the ready formation of magnesium vapor by the reaction of said calcium-silicon alloy and magnesium oxide will be described.

When the aforementioned formation of calcium-silicon alloy is taken into consideration, a natural conclusion is that the reaction of calcined dolomite and silicon at elevated temperatures comprises the following component reactions of Formulas (2) through (5) and the vapor pressure of magnesium is expressed by the Formula (6).

$$0.5Si + CaO = Ca + 0.5SiO_2 \tag{2}$$

$$Ca + MgO = Mg + CaO \tag{3}$$

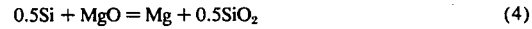
$$0.5Si + MgO = Mg + 0.5SiO_2 \tag{4}$$

$$CaO + SiO_2 = Ca_2SiO_4 \tag{5}$$

$$P_{Mg} = \{P_{Mg(3\sim 5)} \alpha_{Ca}\}^{\frac{m}{m+n}} \{P_{Mg(4\sim 5)} \alpha^{1/2} Si\}^{\frac{n}{m+n}} \tag{6}$$

Formula (2) indicates a reaction which gives birth to the calcium-silicon alloy. Formulas (3) and (4) indicate reactions in which MgO is reduced by the calcium-silicon alloy. In the foregoing formulas, $m$ and $n$ together denote the proportion of reactions of Formula (4) and Formula (5) with respect to the formation of magnesium and $\alpha_{Ca}$ and $\alpha_{Si}$ denote the magnitudes of the activity of Ca and Si respectively in the calcium-silicon alloy. Formula (5) indicates a reaction in which $Ca_2SiO_4$ is formed by the raw material, the CaO from the reaction of Formula (3) and the $SiO_2$ from the reactions of Formulas (2) and (5).

$P_{Mg(3\sim 5)}$ denotes the pressure of magnesium vapor to be thermochemically defined from Formulas (3) and (5) and $P_{Mg(4\sim 5)}$ likewise denotes the magnesium vapor pressure defined from Formulas (4) and (5).

Figure 9:
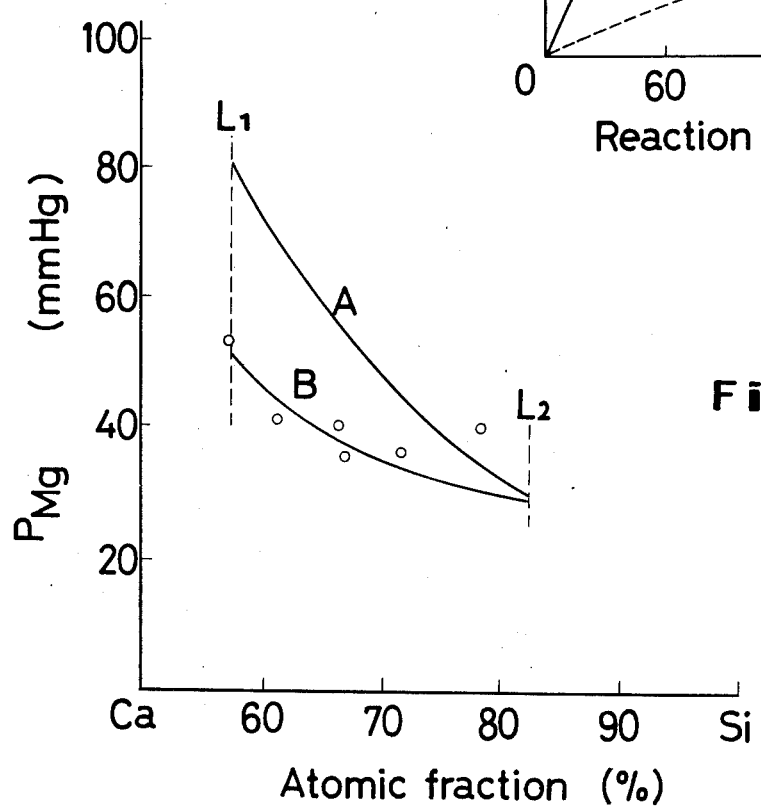
FIG. 9 is a diagram showing the relation between the alloy composition and the equilibrium pressure of magnesium determined with respect to the reduction of magnesium oxide with calcium-silicon alloy.

In FIG. 9, the horizontal axis is graduated for the composition of calcium-silicon alloy and the vertical axis for the equilibrium vapor pressure of magnesium at 1200° C. In the diagram, the curves indicated as A and B represent the values calculated from Formula (6); the curve A being the results of the calculation reflecting the values $\alpha_{Ca}$ and $\alpha_{Si}$ and the dots connected by the curve B being those actually found. At 1200° C, the calcium-silicon alloy in the composition distribution between $L_1$ and $L_2$ is noted to be in the liquid phase.

From FIG. 9, there is observed a trend for the pressure of magnesium vapor to increase with the increasing calcium content in the calcium-silicon alloy.

The equilibrium vapor pressure of magnesium in the temperature zone ranging from 1200° to 1600° C was also measured. The measurement of the equilibrium vapor pressure of magnesium made by the inventors at such high temperatures as these has never been attempted to date.

To be specific, roasted dolomite and metallic silicon were both pulverized to a particle size fine enough to pass an 80-mesh sieve and the powders were mixed in respective amounts to give a molar ratio of MgO/Si = 2/1 and the resultant mixture was molded into briquets having an apparent specific gravity of 1.8 g/cm³. The briquets thus prepared were heated in the atmosphere of argon gas at 1200° C under normal pressure for five minutes so as to give rise to a calciumsilicon alloy therein. The consequent specimen briquets were then tested for equilbrium pressure of magnesium vapor. The results were 70 mmHg at 1250° C, 180 mmHg at 1350° C, 400 mmHg at 1450° C, and 1330 mmHg at 1600° C respectively.

All these results are found to be governed by the following expression.

$$\log P \text{ mmHg} = 10{,}454/T + 8.706 \tag{7}$$

From this formula, one can estimate that the temperature at which the pressure of magnesium vapor reaches one atmosphere (= 760 mmHg) is about 1520° C.

In contrast in the Magnetherm process, a granular dolomite is fed into and dissolved in a multi-component molten slag and a granular ferrosilicon separately introduced therein is caused to react with MgO present in the molten slag as indicated by Formula (8), with the result that said reaction produces magnesium.

$$\begin{array}{ll}\text{MgO} + 1/2\text{Si} & = \text{Mg} + 1/2\text{SiO}_2 \\ \text{(in molten (molten} & \text{(vapor) (in molten slag)} \\ \text{slag) ferrosilicon)} & \end{array} \tag{8}$$

The equilibrium pressure of magnesium vapor existing in this case is expressed by the following formula (9):

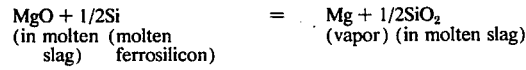

$$P_{Mg}=P_{Mg\sim 8}\frac{{}^a\text{MgO}\cdot{}^a\text{Si}^{1/2}}{{}^a\text{SiO}_2{}^{1/2}} \tag{9}$$

wherein, $P_{Mg\sim 8}$ denotes the equilibrium pressure of magnesium vapor to be thermochemically fixed on condition that the components involved in Formula (8) each have 1 as the magnitude of activity and a denotes the magnitude of activity of each component in the molten slag.

An attempt to have the MgO content in the molten slag maintained at a high enough level to maintain the activity of MgO at a high level is difficult to accomplish because the effort inevitably involves an increase in the melting point of the slag. At temperatures of about 1600° C, the equilibrium pressure of magnesium vapor indicated by Formula (9) is barely on the order of several tens of mmHg. In contrast, in the reaction according to the present invention, there is obtained an extremely high equilibrium pressure of magnesium vapor as described above. The reaction velocity and the conversion, therefore, can both be maintained at their respectively high levels without requiring any particularly higher temperature or higher vacuum degree in the operation of reduction. Further, the possibility of accelerating the consumption of electrodes because of the reaction of the electrode carbon with the molten slag and the gases such as of CO and SiO produced in consequence of said reaction in which these products react with magnesium vapor to produce impurities such as of C, Si and MgO within the condensed magnesium is diminished to a notable extent. This suggests that production of high purity magnesium can be achieved by the method of the present invention.

Now specific measures taken in the present invention for enabling the aforementioned effect to be fully manifested will be described in conjunction with those adopted for the control of the composition of molten slag, temperature and other operating conditions, etc.

Figure 10:
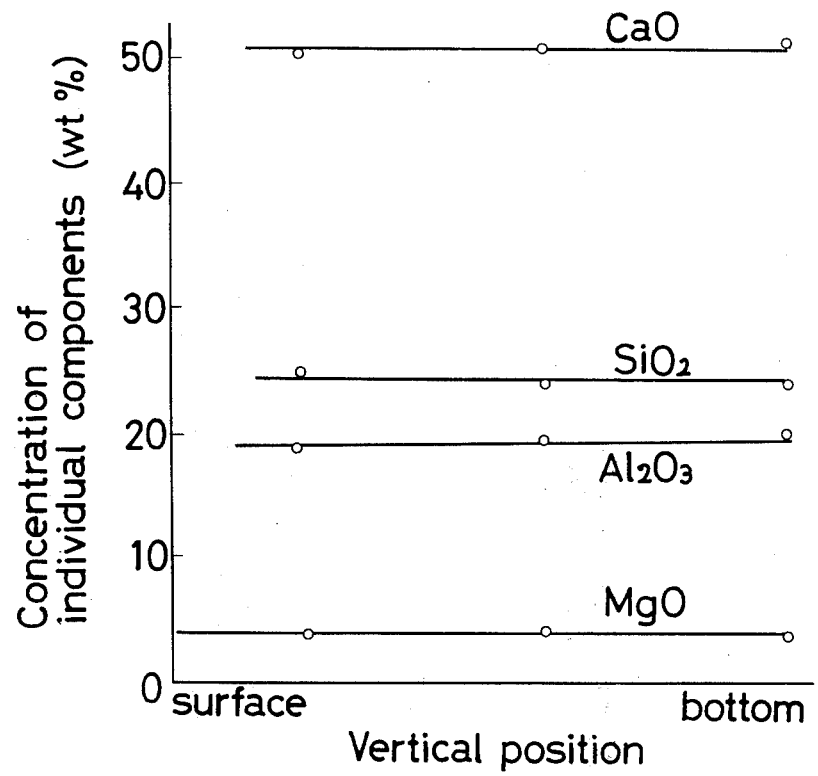
FIG. 10 is a diagram showing the composition distribution of the slag in the interior of the furnace operated by the method of the present invention.

When briquets having an overall bulk density of from 1.4 to 2.2 g/cm³ are introduced into a molten slag having a specific gravity of 2.9 g/cm³ and an elevated temperature, they are heated while they remain in a floating state on top of the surface of the molten slag so that said reaction which brings about the formation of calcium-silicon alloy and the occurrence of the vapor of magnesium proceeds very rapidly. While this reaction is proceeding, the briquets as the raw material are retained at a relatively lower temperature than that of the molten slag because of the endothermic nature of said reaction and they are not readily wetted by the molten slag because of the magnesium vapor vaporizing from the briquets and the silicon alloy still remaining inside the briquets. Dissolution of the briquets into the molten slag can, therefore, be minimized. As the reaction causing the production of magnesium is substantially terminated, the residual briquets are quickly elevated to a temperature approximating the temperature of the molten slag and at the same time the wetting of the briquets with the molten slag is accelerated proportionally. The briquets, therefore, are quickly dissolved. After that, they are no longer under the reaction and retain their composition unimpaired. By this reason, the compositions of the molten slag is at all times identical with the composition of the residual briquets from which the vaporization magnesium has substantially terminated. This means that said composition is uniformly distributed throughout the entire interior of the furnace. A typical example is depicted in FIG. 10. In the diagram of FIG. 10, typical results of a test performed by the method of the present invention (as indicated afterward in Example 1), with the horizontal axis indicates the vertical position of slag from the surface of the molten slag to the bottom of the furnace and the vertical axis represents the concentrations of individual components of slag versus positions indicated. It is seen that the composition of the molten slag is uniform throughout the interior of the furnace without reference to the position within the furnace.

Figure 11:
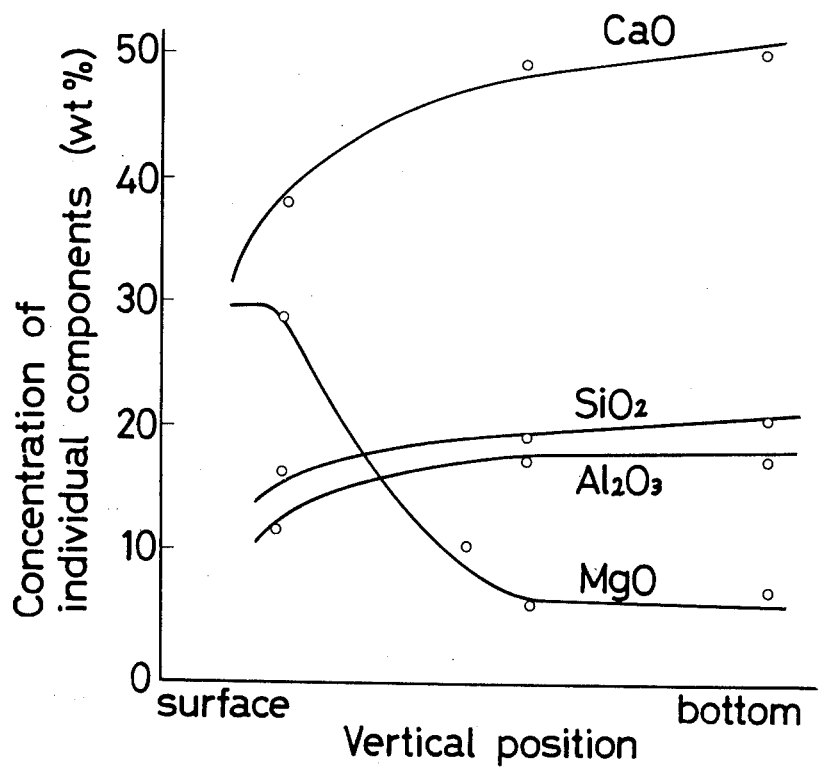
FIG. 11 is a diagram showing the composition distribution of the slag in the interior of the furnace interior operated by the Magnetherm Process.

FIG. 11 shows the results of a test performed by using granular raw materials in accordance with the Magnetherm process (as indicated afterward in Comparative Example 1). It is clear from the diagram of FIG. 11 that magnesium oxide is contained more in the layer of the molten slag close to the open surface than elsewhere in the molten slag. The magnesium oxide which has been dissolved on the surface of the molten slag reacts with the ferrosilicon falling in the form of drops within the molten slag to produce magnesium vapor. In consequence of this reaction, the concentration of magnesium oxide in the molten slag gradually decreases in the direction from the top to the bottom of the furnace.

Figure 12:
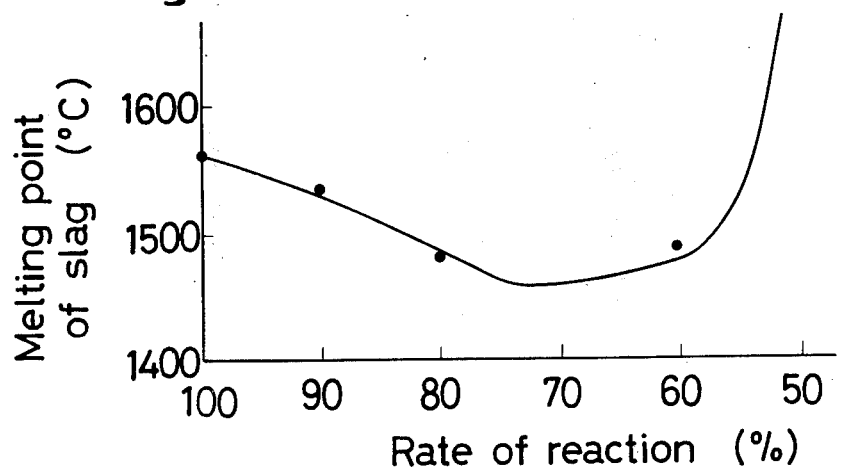
FIG. 12 is a diagram showing the relation between the conversion of magnesium oxide and the melting point of the slag in the operation according to the method of the present invention.
Figure 13:
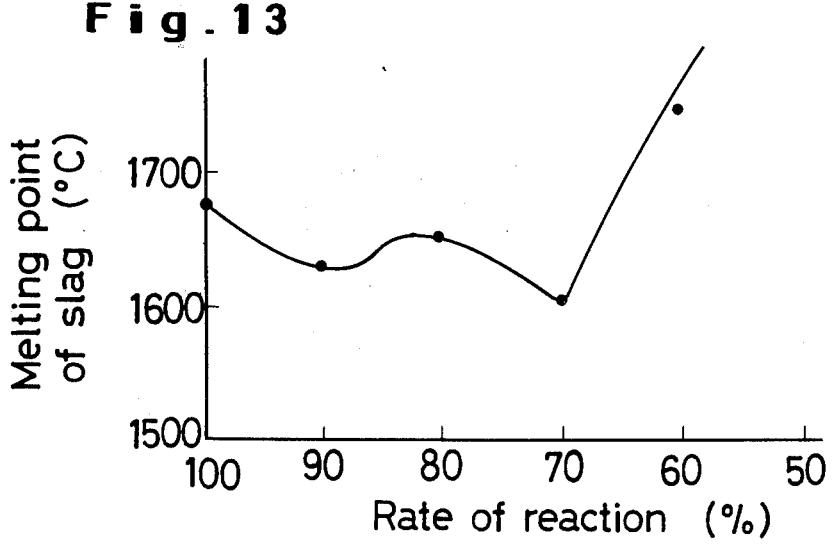
FIG. 13 is a diagram showing the relation between the conversion of magnesium oxide and the melting point of the slag in the operation according to the Magnetherm Process.

The concentration distribution in the molten slag such as is described above has not little bearing upon the maintenance of the molten state of the slag. This relationship will be clarified herein below with reference to FIG. 12 and FIG. 13. FIG. 12 represents the results obtained by the method of the present invention and FIG. 13 those obtained in accordance with the Magnetherm process. In either of these the diagrams, the horizontal axis indicates the rate of reaction and the vertical axis for the melting point of the slag. Where the concentration distribution is uniform as obtainable by the method of this invention, the molten state of the slag is easily maintained at relatively low temperatures in a wide range of reduction rates as is evident from FIG. 12.

Where the concentration distribution has a vertically gradient tendency as obtained by the Magnetherm process, however, relatively high temperatures are required in order for the slag to be maintained in the molten state as is clear from FIG. 13. If the operating temperature is fixed in the neighborhood of 1650° C, for example, the slag assumes a solid state unless the production of magnesium is retained over a level of about 70%. Such occurrence of the solid state causes some trouble in the operation. Thus, the operation becomes all the more difficult because both temperature and rate of reduction must be maintained at high levels at all times.

The characteristic features of the present invention which has been accomplished on the basis of the matters brought to light as described above by the inventors will be described below.

The raw materials to be used for the method of the present invention have only to be blended in respective amounts such that the slag remaining after the completion of the reaction producing magnesium will eventually fall within the conventional range of composition of the blast furnace slag. A typical composition is such that the following molar ratios are satisified: $MgO/CaO = 1$, $MgO/Si = 1.8$ to 3 and $Al_2O_3/MgO$ (final slag) = 1.0 to 3.0.

It follows that the components making up the briquets as the raw material ought to satisfy the molar ratios of $Si/2MgO = 0.9$ to 1.5 and $CaO/MgO = 0.9$ to 1.5. The alumina may be incorporated in the briquets or it may be introduced into the furnace separately of the briquets.

The components each in a powdered form are mixed in the specified ratio and the resultant mixture is molded into briquets. In this case, the alumina may be admixed with other components and incorporated into said briquets or it may be fed into the furnace separately of the briquets, in either case in an amount to satisfy the aforementioned molar ratio.

It is essential that the briquets introduced into the furnace remain floating in an undisintegrated form on top of the molten slag until the reaction proceeding inside the briquets comes to termination. To satisfy this condition, the briquets are required to have an overall bulk density in the range of from 1.4 to 2.2 $g/cm^3$, squeeze strength at room temperature in the range of from 30 to 230 $kg/cm^2$, an overall porosity in the range of from 35 to 55% and a refractoriness in the range of Pyrometric Cone No. 15 to No. 31.

The conditions for the operation of the furnace will be described now.

These operating conditions are required to be such that the reaction bringing about the formation of calcium-silicon alloy within the briquets and the reaction caused by the formed calcium-silicon alloy to reduce magnesium oxide will be terminated quickly and the residual briquets will be dissolved subsequently. In the present invention, the temperatures at which said requirement is fulfilled have been fixed in the range of from 1300° to 1700° C. The pressure under which the furnace interior is to be maintained has been fixed in the range of from the magnitude to be determined in accordance with the aforementioned formula, $\log P = -10{,}454/T + 8.706$, to 20 mmHg. The equilibrium pressure of magnesium vapor increases in proportion as the operating temperature rises. The velocity of the reduction reaction increases in proportion as the operating pressure decreases. Thus the operating temperature may desirably be increased and the operating pressure decreased respectively without adverse restriction to the reducing reaction itself. The aforementioned upper limit of the operating temperature and the lower limit of the operating pressure are nevertheless fixed with due consideration paid to thermal resistivity of the reaction equipment, reactivity between the molten slag and the electrode carbon, etc. Said lower limit of the temperature range has been fixed in consideration of the lowest possible temperature that permits the slag to retain its molten state.

When the briquets are fed into the electric furnace whose interior is maintained under the aforementioned operating conditions, they float on the molten slag and at the same time expose themselves to heating. Within an extremely short time, a calcium-silicon alloy in a molten state is formed within the briquets and this alloy immediately undergoes a solid-liquid reaction with solid magnesium oxide to liberate magnesium vapor. Throughout this process, the briquets remain in said floating state. The residual briquets in which said evolution of magnesium vapor has substantially terminated are quickly dissolved and converted into molten slag. The molten slag is discharged from the furnace interior at proper time intervals in much the same way as practiced ordinarily in the conventional electric furnace. The magnesium vapor, on the other hand, is led into a proper known device such as, for example, a condenser, in which it is liquefied or solidified by cooling and consequently obtained as the final product.

The effect of the present invention manifested in the production of magnesium-containing briquets and in the manufacture of metallic magnesium will be described herein below with reference to preferred embodiments and comparative examples.

EXAMPLE 1

Green briquets prepared by blending ferrosilicon (having a silicon content of 75% by weight), roasted dolomite and calcined magnesite in respective amounts to give molar ratios of $Si/2MgO = 1.1$ and $CaO/MgO = 1.0$ were subjected to a burning treatment at 1200° C for 30 minutes to give birth to magnesium-containing heat treated briquets having a microstructure comprising ferrosilicon grains, the largest particle diameter of which was 0.1mm, and other grains of a particle diameter of less than 0.1mm, containing CaO, CaSi alloy, MgO and $SiO_2$ and having an overall bulk density of 1.5 g/cm$^3$, squeeze strength of 85 kg/cm$^2$ at room temperature, an overall porosity of 51% and a refractoriness of Pyrometric Cone No. 30 and measuring 20mm in average diameter. Under the operating conditions indicated below, these magnesium-containing heat treated briquets were subjected to a refining treatment to produce magnesium. Consequently, the treatment produced magnesium in a yield of 94.6%.

Amount of briquets introduced as the raw material - 87.6 kg/hour
Internal pressure of furnace (atmosphere of argon) - 50 mmHg
Internal temperature of furnace - 1520° C Calculation shows the yield of magnesium by this operation to be 17kg per hour.

EXAMPLE 2

Green magnesium-containing briquets were prepared by blending ferrosilicon (having a silicon content of 75% by weight) and roasted dolomite in respective amounts to give molar ratios of $Si/2MgO = 1.5$ and $CaO/MgO = 1.3$, acquire a microstructure containing ferrosilicon grains, the largest particle diameter of which was 0.1mm and show an overall bulk density of 2.1 g/cm$^3$, squeeze strength of 230 kg/cm$^2$ at room temperature, an overall porosity of 45% and a refractoriness of Pyrometric Cone No. 21 and measure 5 to 50mm in diameter. Under the operation conditions indicated below, these briquets were subjected to a refining treatment. Consequently, the treatment produced magnesium in a yield of 95.6%.

Amount of briquets introduced as the raw material - 72.6 kg/hour
Internal pressure of furnace (atmosphere of argon) - 700 mmHg
Internal temperature of furnace - 1560° C Calculation shows the yield of magnesium by this operation to be 12kg per hour.

COMPARATIVE EXAMPLE 1

Ferrosilicon and dolomite ore each having the same composition as that in Example 1 were blended in their respective powdered state without being subsequently briquetted. Under the same operating conditions as those of Example 1 (except the internal pressure of furnace was fixed at 17 mmHg), the blended powder was subjected to a treatment by the Magnetherm process (wherein the charge was submerged and dissolved in the molten slag and the molten charge emitted magnesium vapor). Consequently, this treatment gave the following results.

Amount of blended powder introduced as the raw material - 62.5 kg/hour
Internal pressure of furnace (atmosphere of argon) - 17 mmHg
Internal temperature of furnace - 1500° C
Yield of magnesium - 82.0%
Amount of magnesium obtained - 10.5 kg/hour

COMPARATIVE EXAMPLE 2

Magnesium-containing heat treated briquets of a composition having molar ratios of $Si/2MgO = 0.9$ and $CaO/MgO = 1.5$ and showing an overall bulk density of 2.3 g/cm$^3$, squeeze strength of 240 kg/cm$^3$ at room temperature, an overall porosity of 33% and a refractoriness of Pyrometric Cone No. 32 were prepared by using, as the raw materials, ferrosilicon (having a silicon content of 75% by weight), roasted dolomite, calcite and magnesite. Under the same operating conditions as in Example 1, these briquets were subjected to a refining treatment. Consequently, the yield of magnesium obtained by this treatment was not more than 80%.

In this operation, since squeeze strength at the room temperature was so high that disintegration of briquets into a fine powder otherwise involved at the time of introduction into the furnace could not occur. Since they had a too high bulk density, the briquets introduced into the furnace were partially submerged into the molten slag and therefore tended to experience retardation in the vaporization of magnesium. Also because the refractoriness was too high, it was observed that the dissolution of residual briquets into the molten slag which would otherwise occur quickly after the completion of the vaporization of magnesium did not proceed smoothly.

The disadvantageous factors mentioned above are probably the cause of the lower yield of magnesium finally achieved by the operation described above.

COMPARATIVE EXAMPLE 3

Magnesium-containing heat treated briquets having entirely the same composition as that of the briquets of Comparative Example 2 and showing an overall bulk density of 1.3 g/cm$^3$, squeeze strength of 60 kg/cm$^2$ at room temperature, an overall porosity of 60% and a refractoriness of Pyrometric Cone No. 20 were prepared. Under the same operating conditions as those in Example 1, these briquets were subjected to a refining treatment. Consequently, the yield of magnesium was only 82.0%.

The metallic magnesium which was obtained in consequence of this treatment suffered from heavy inclusion of powdered magnesia and other impurities, probably because the briquets were seriously disintegrated into a fine powder at the time of introduction into the furnace owing to insufficiency of bulk density, porosity and squeeze strength.

EXAMPLE 3

An electric furnace of a construction illustrated in FIG. 14 was used. In the diagram, 1 denotes a storage tank for briquets as the raw material and provided with a damper unit capable of feeding briquets continuously or intermittently, 2 an inlet for the raw material, 3 an upper space within the furnace interior, 4 a vertically movable electrode, 5 an electrode at the bottom of furnace, 6 a tap, 7 an outlet for magnesium vapor, 8 a device for cooling magnesium vapor, 9 molten slag and 10 a furnace shell (lined with carbon plate). The furnace measured 1m in inside diameter and about 3m in height.

By using, as the raw materials, 80 parts of roasted dolomite (comprising 41% by weight of magnesium oxide and 58% by weight of calcium oxide) and 20 parts of ferrosilicon (having a silicon content of 75% by weight) each pulverized to a particle size fine enough to pass an 80-mesh sieve, briquets having a bulk density of 1.8 g/cm³ and an average diameter of 10mm were prepared. The furnace interior was displaced with argon and then adjusted to a vacuum degree of 50 mmHg and a reaction temperature of 1520° C. Into this furnace, the briquets and alumina were introduced. When the molten slag increased in volume to have its level reach the position indicated in FIG. 14, the introduction of the raw materials was temporarily suspended to permit the internal pressure to return to normal pressure. Subsequently, the entire volume of produced magnesium and half the volume of molten slag were discharged out of the furnace. Then, the furnace interior was again evacuated to 50 mmHg and the raw materials were introduced therein. By repeating this cycle, the operation was carried out stably. The operating conditions involved in this case and the results of the operation computed by the hour were as shown below.

| | | |
|---|---|---|
| (1) | Rate of introduction of briquets | - 78 kg/hour |
| (2) | Rate of introduction of alumina | - 10 kg/hour |
| (3) | Amount of magnesium obtained | - 15 kg/hour |
| (4) | Yield of magnesium (based on magnesium oxide present in the raw materials) | - 95% |
| (5) | Rate of molten slag discharged Composition of discharged slag | - 64 kg/hour - 55% of CaO, 2% of MgO, 28% of $SiO_2$ and 15% of $Al_2O_3$ |
| (6) | Rate of ferrosilicon discharged Composition of discharged ferrosilicon | - 9 kg/hour - 52% of Si and 48% of Fe |

COMPARATIVE EXAMPLE 4

Entirely the same operation as described in Example 3 was carried out, except that the same roasted dolomite, ferrosilicon and alumina as used in Example 3 were each adjusted to particles measuring 5 to 14mm and stored in separate storage tanks. At the time of introduction into the furnace, they were delivered in respective amounts to give the same mixing ratio as in Example 3. The rates which the raw materials were fed were fixed at levels such that no solid layer could develop on the surface of the molten slag. The results were as shown below.

| | | |
|---|---|---|
| (1) | Rate of introduction of roasted dolomite | - 43 kg/hour |
| (2) | Rate of introduction of ferrosilicon | - 13 kg/hour |
| (3) | Rate of introduction of alumina | - 7 kg/hour |
| (4) | Amount of magnesium obtained | - 9 kg/hour |
| (5) | Yield of magnesium | - 82% |
| (6) | Rate of molten slag discharged Composition of discharged slag | - 46 kg/hour - 54% of CaO, 7% of MgO, 24% of $SiO_2$ and 15% of $Al_2O_3$ |
| (7) | Rate of ferrosilicon discharged Composition of discharged ferrosilicon | - 7 kg/hour - 58% of Si and 42% of Fe |

Comparison of Example 3 and Comparative Example 4 clearly shows that the method of the present invention affords the product in a notably higher yield than the method of the conventional Magnetherm process.

EXAMPLE 4

Entirely the same operation as described in Example 4 was carried out, except that the rate of the introduction of raw materials was about doubled (about tripled relative to Comparative Example 4). Despite the increased rate of raw material introduction, the operation could be carried out stably without entailing any operational trouble. The results of this operation were as follows.

| | | |
|---|---|---|
| (1) | Rate of introduction of briquets | - 155 kg/hour |
| (2) | Rate of introduction of alumina | - 19 kg/hour |
| (3) | Amount of magnesium obtained | - 28 kg/hour |
| (4) | Yield of magnesium | - 92% |
| (5) | Rate of molten slag discharged Composition of discharged slag | - 127 kg/hour - 55% of CaO, 3% of MgO, 27% of $SiO_2$ and 15% of $Al_2O_3$ |
| (6) | Rate of ferrosilicon discharged Composition of discharged ferrosilicon | - 19 kg/hour - 54% of Si and 46% of Fe |

What we claim is:

1. Magnesium-containing briquets containing, as components each in a finely divided and dispersed state, magnesium oxide, components naturally present in a magnesium ore, one member selected from the group consisting of ferrosilicon and silicon, and calcium oxide, and having an overall bulk density in the range of from 1.4 to 2.2 g/cm$^3$, squeeze strength at room temperature in the range of from 30 to 230 kg/cm$^2$, an overall porosity in the range of from 35 to 55% and a refractoriness in the range of Pyrometric Cone No. 15 to No. 31.

2. The magnesium-containing briquets according to claim 1, wherein a calcium-silicon alloy is additionally contained as a component in a finely divided and dispersed state.

3. The magnesium-containing briquets according to claim 1, wherein the largest particle diameter of the contained components is 0.1mm.

4. The magnesium-containing briquets according to claim 1, wherein the components are contained in respective amounts such as to give molar ratios of Si/2-MgO = 0.9 to 1.5 and CaO/MgO = 0.9 to 1.5.

5. Magnesium-containing briquets containing, as components each in a finely divided and dispersed state, magnesium oxide components naturally present in a magnesium ore and a calciumsilicon alloy and having an overall bulk density in the range of from 1.4 to 2.2 g/cm$^3$, squeeze strength at room temperature in the range of from 30 to 230 kg/cm$^2$, an overall porosity in the range of from 35 to 55% and a refractoriness in the range of Pyrometric Cone No. 15 to No. 31.

6. The magnesium-containing briquets according to claim 5, wherein the largest particle diameter of the contained components is 0.1mm.

7. The magnesium-containing briquets according to claim 5, wherein the components are contained in respective amounts such as to give molar ratios of Si/2-MgO = 0.9 to 1.5 and CaO/MgO = 0.9 to 1.5.

8. A method for the manufacture of metallic magnesium, which comprises introducing briquets produced from the raw materials containing calcium oxide, magnesium oxide and at least one member selected from the group consisting of silicon and ferrosilicon into an electric furnace retaining therein a mineral slag composed of a uniformly dispersed system of calcium oxide, magnesium oxide, silicon dioxide, alumina and components naturally present in a magnesium ore and held in a molten state, allowing said briquets to float on the surface of said molten slag, then causing formation of a calcium-silicon alloy within said briquets, enabling the formed calcium-silicon alloy to react with magnesium oxide within said briquets and thereby causing emanation of magnesium vapor, thereafter allowing the exhausted briquets to dissolve into the molten slag and cooling the magnesium vapor into metallic magnesium.

9. The method according to claim 8, wherein the briquets introduced into the furnace have an overall bulk density in the range of from 1.4 to 2.2 g/cm$^3$, squeeze strength at room temperature in the range of from 30 to 230 kg/cm$^2$, an overall porosity in the range of from 35 to 55% and a refractoriness in the range of Pyrometric Cone No. 15 to No. 31.

10. The method according to claim 9, wherein the briquets contain magnesium oxide, components naturally present in a magnesium ore, one member selected from the group consisting of ferrosilicon and silicon, and calcium oxide.

11. The method according to claim 10, wherein the briquets additionally contain a calcium-silicon alloy.

12. The method according to claim 9, wherein the briquets contain magnesium oxide, components naturally present in a magnesium ore and a calcium silicon alloy.

* * * * *